Patented Nov. 9, 1948

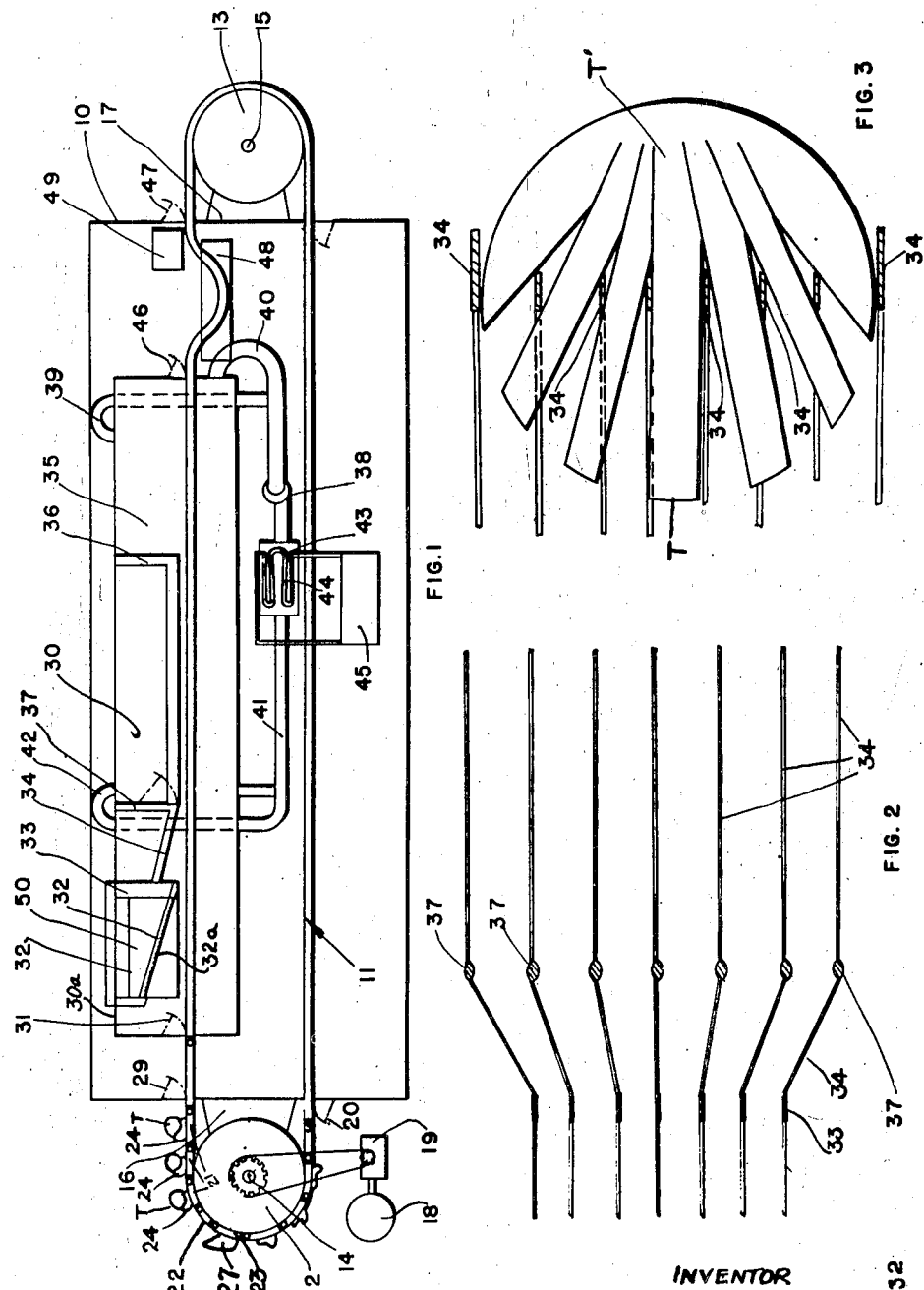

2,453,130

UNITED STATES PATENT OFFICE 2,453,130

FREEZING HIGH LIQUID CONTENT FRUITS AND VEGETABLES

Albert F. Hoffman, East Orange, N. J.

Application April 28, 1945, Serial No. 590,936

9 Claims. (Cl. 99—193)

This invention relates to methods and apparatus for freezing food products, and has particular reference to methods and apparatus for quick-freezing tomatoes and other vegetables and fruits of similar bulk and liquid content.

The art of quick-freezing food products has been highly developed, particularly in the treatment of vegetables, meats, and the like. Each of these food products has presented certain problems that had to be solved in order to obtain a product of satisfactory appearance and flavor. A good many of these food products can be and have been frozen by direct contact with a refrigerant liquid for the reason that they have skins or surfaces that repel or prevent absorption of the liquid into the product.

Other food products which are more permeable have been frozen by placing them in a blast of cold air refrigerated to a sub-zero temperature, thus obtaining a quick-freezing of the product without the formation of ice crystals of such size as to damage or to cause deterioration of the cell structure. Still other products, such as fish, have been frozen by passing blocks of the fish between metallic plates or belts and applying a refrigerant solution to the plates in order to obtain a high rate of heat exchange.

Attempts have been made in the past to freeze tomatoes and similar fruits and vegetables by these processes, but such attempts have not been successful. Tomatoes contain about 98% water by weight. This water is not tightly bound into the cells or pulp of the tomato and as a consequence, the tomato is easily dehydrated and oxidized when it is cut or sliced and exposed to air. Moreover, the moisture tends to drain from the tomato with the result that it acquires a peculiar and unappetizing appearance, even after standing for a short period of time in the air.

It has not been practicable to freeze whole tomatoes for the reason that the ice formed on the surface portions of the tomato as the freezing progresses, acts as insulation and thus slows down the rate of heat transfer. This slowing of the heat transfer results in a relatively slow freezing of the center of the tomato with the result that large ice crystals are formed that destroy the cellular structure of the tomato or damage it so badly that when the tomato is thawed and sliced, it has a very unappetizing mushy appearance.

An object of the present invention is to provide a method of quick-freezing tomatoes and the like, whereby the moisture content of the tomato is not substantially changed and the appearance and flavor are not impaired by the quick-freezing operation.

Another object of the invention is to provide apparatus for processing and quick-freezing tomatoes in such a manner as to preserve the appearance and flavor of the tomato.

Other objects of the invention will become apparent from the following description of typical methods and apparatus for quick-freezing tomatoes.

In accordance with the present invention in which the treatment of tomatoes will be described by way of example, the tomatoes are first sliced and then transferred to a quick-freezing zone where the slices are spread apart and subjected to a low temperature, for example 10° to 50° below zero F., so that the surfaces of the slices are frozen before any substantial amount of moisture can evaporate or drain from the surfaces.

More particularly, the tomato preferably is partially sliced into a plurality of connected slices by very keen, thin knives so that the shape of the tomato and its cell structure are not substantially altered. The slices are then spread apart and immediately subjected to the action of a freezing medium, preferably very cold air, which immediately hardens the surfaces of the slices and causes a quick-freezing of the slices. It is very important that the cut surfaces of the slices be frozen almost immediately upon their separation so that oxidation and loss of moisture are avoided. Some advantage is gained by using cold knives inasmuch as they cause the moisture to congeal and thereby "set" the surfaces of the slices. Following quick-freezing, the slices may be pressed together again and the tomato wrapped and packaged and stored at low temperature in order to preserve its frozen condition.

Tomatoes frozen in the manner generally described above, maintain their color, flavor and cellular structure for long periods of time and may be thawed and used exactly in the same manner as fresh tomatoes. If desired, tomatoes may be used in their frozen state, and in this form, provide a flavorful and appetizing foodstuff for sandwiches, chilled salads and the like.

For a better understanding of the present invention, reference may be had to the accompanying drawings in which:

Figure 1 is a view in side elevation and partially in section of a typical form of apparatus for quick-freezing tomatoes;

Figure 2 is a plan view of a device for separating or spreading the slices of the sliced tomato;

Figure 3 is a view in end elevation illustrating the action of the spreading device in spreading the slices of the tomato;

Figure 4:
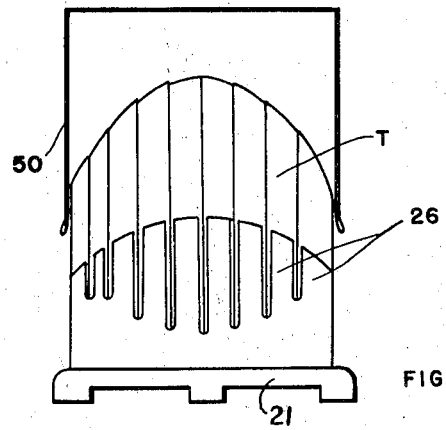
Figure 4 is an end view of a typical form of holder for receiving and conveying a tomato through a slicing and freezing device.

The form of freezing apparatus chosen for purposes of illustration may consist of a tunnel or chamber 10 formed of metal, wood, or other material which is suitably insulated to avoid heat losses. Passing through this elongated tunnel is a conveyor 11 which is supported at opposite ends by means of sprockets 12 and 13, which are rotatably mounted on the shafts 14 and 15, respectively. The shafts may be supported in suitable journals 16 and 17 extending outwardly from opposite ends of the tunnel 10. One or both of the shafts 14 and 15 may be driven in any suitable way, such as for example, by means of the motor 18 through a reduction gearing 19 and chain and sprocket drive 20.

Figure 5:
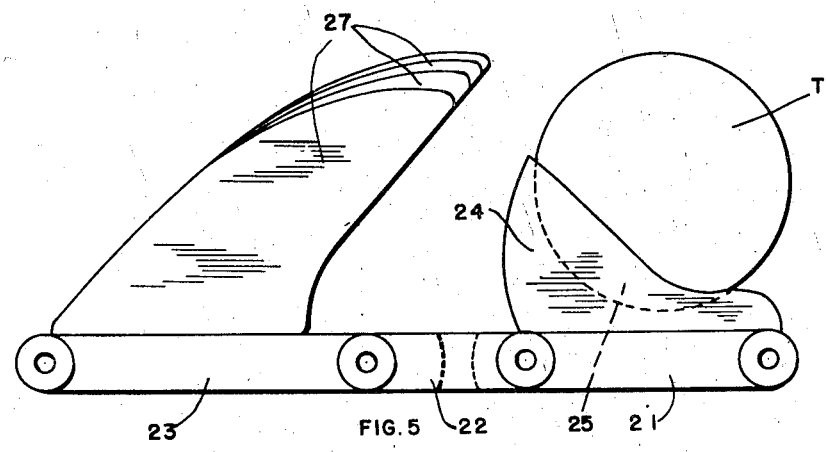
Figure 5 is a view in side elevation of a portion of the conveyor illustrating the tomato holder and defrosting scrapers.

The conveyor 11 may be made up of a plurality of links 21, 22, 23, etc. As shown in Figure 5, the links 21 of the conveyor 11 may be provided with a chuck or holder 24 formed of a rubbery material, which is provided with a concavity 25 for receiving a whole tomato. The holder 24 preferably is made up of a plurality of resilient fins 26 extending longitudinally of the holder in order to permit the passage of slicing knives therebetween.

As illustrated in Figure 1, a plurality of links 21 having the holders 24 thereon may be arranged in sequence on the chain, for example, two or more of these holders may be connected end to end.

Figure 6:
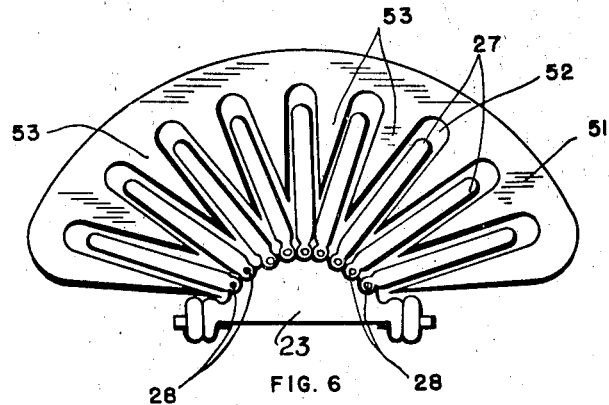
Figure 6 is a view in end elevation of a modified form of a freezing device showing the scrapers passing through the device.

The links 22 may be of generally H-shaped construction and act as separators between the links 21 and the links 23, which are provided with scrapers, the purpose of which will be described hereinafter. The scrapers preferably are formed of rigid material and may consist of elongated fin-shaped elements 27 which are substantially the same thickness as the slices of the tomato which are formed as described hereinafter. The elements 27 are connected at their lower edges to the link 23 by means of hinges 28 to permit them to be spread fanwise (Figure 6).

Referring against to Figure 1, the ripe, but firm tomatoes T after being washed and chilled to slightly above freezing temperature, that is, 32° F., are passed into the tunnel through a flap-like door 29 and thence into an inner chamber 30 where the tomatoes are sliced and frozen. The inner tunnel or chamber 30 extends substantially the length of the tunnel 10 and is provided with a hinged flap-like inlet door 31 through which the tomatoes and the conveyor 11 pass. Within the chamber 30 are a plurality of parallel slicing knives 32 which are formed of thin steel and are supported under tension by means of a U-shaped bracket 33 connected to the top 30a of the tunnel 30. The edges of the knives 32 may be provided with fine teeth 32a which aid in cutting through the skin of the tomatoes as well as the pulp without damaging its cell structure appreciably. If desired, thin razor-like knives may be used, or even thin rotary knives. The knives should be of such thickness and sharpness that the slices may not be immediately separated or compressed sufficiently to squeeze the juice from the slices. The optimum number of slices and consequent spacing of the knives depends upon the size and nature of the fruit or vegetable. For example, one-fourth inch slices have been found desirable for tomatoes, making nine slices for a good-sized tomato.

A thin metal tape 34 is connected to the rear end of each of the knives or the leg of the bracket supporting a knife so that it will engage in the slot cut by the knife. As best shown in Fig. 2, the tapes 34 diverge so that the tomato slices are spread apart as they travel on the conveyor toward the right-hand end of the tunnel 30. Preferably, the knives 32 are arranged to cut partially through the tomato T, as best shown in Fig. 3, leaving a connecting web T', so that the slices may be spread fanwise by the tapes. However, if desired, the tomatoes may be sliced completely through to form separate slices that are held together by the resiliency of the holder 24.

The tapes 34 diverge sufficiently to spread the slices apart and then extend in parallel relationship lengthwise through the quick-freezing section 35, which forms a part of the tunnel 30. The tapes 34 may extend a greater portion of the length of the freezing section 35, and are supported in parallel relationship by projecting rods 36 and 37.

The tapes 34 are of sufficient width, for example, between about one-quarter and one-half inch each, so that they not only spread the slices apart, but maintain the slices in spaced apart relationship by engagement of their upper and lower edges with the adjacent slices as shown in Fig. 3. The outermost tapes 34 are sufficiently wide to prevent the outermost slices of the tomatoes from falling to horizontal position or below horizontal.

The freezing chamber or tunnel 35 may be provided with any desired type of quick-freezing or refrigerating equipment. For example, as shown in Fig. 1, the chamber 35 may be refrigerated by means of circulated cold air refrigerated to a quick-freezing temperature. The circulating system may include a blower 38 having its intake connected by means of suitable conduits 39 and 40 to the discharge end of the chamber 35, and its pressure side connected by means of suitable conduits 41 and 42 to the inlet end of the chamber 35. The pressure side of the blower 38 may be connected to a chamber 43 which is provided with a cooling coil 44, supplied with refrigerant by means of a conventional motor-compressor system 45. Thus, with the compressor system 45 and the blower 38 in operation, a strong blast of cold air is passed over and between the tomato slices to quick-freeze them.

Some of the refrigerated air will be lost, of course, from the refrigerating section 35 of the tunnel. This chilled air will pass through the tunnel 30 and into the main chamber or tunnel 10 so that these chambers are maintained at low temperatures thus aiding in the conditioning of the tomatoes for the quick-freezing operation and keeping the knives 32 and tapes 34 at low temperature. Inasmuch as the tomatoes are already chilled almost to their freezing point, the cold knives will tend to congeal the moisture on the cut surfaces and will minimize loss of moisture from the slices. The provision of the doors 29, 31 and 37 and the doors 46 and 47 in the discharge ends of the freezing chamber 35 and the tunnel 10, respectively, reduces the amount of the refrigerated air escaping from the tunnels 10 and 30.

As the frozen tomatoes leave the freezing section 35, they are spread open fanwise and it may be desirable to close the slices again into the general form of a tomato. In order to accomplish this, the connecting web T' of the tomato may be heated slightly by dipping it in a bath of warm water in a receptacle 46 and then forcing the slices together by means of converging plates 49 adjacent the discharge end of the tunnel 10. The partially thawed web T will quickly refreeze because of absorption of the heat therein by the remainder of the tomato. If the tomatoes are cut into separate slices, the thawing bath can be omitted. The now hardened, frozen and reshaped tomatoes may be passed through suitable wrapping and packaging devices and transferred in the usual way to a cold room where they are maintained at about zero temperature until ready for distribution.

The apparatus described above is susceptible to considerable modification without altering the results obtained therewith. For example, it may be desirable to provide resilient retaining plates 50 on opposite sides of the slicing knives 32 in order to make certain that the slices will not fall apart before they are separated by the tapes 34. The retaining plates 50 are best shown in Figures 1 and 4.

Also, if desired, the slices may be frozen by direct contact with chilled fins which are introduced between the slices after they have been separated by the tapes 34. In this form of the device, the tapes 34 are shorter than illustrated in Figure 1 and the freezing section 35 is replaced by an elongated jacket of the kind illustrated in Figure 6 of the drawings. This jacket 51 may be semi-cylindrical in shape and is provided with substantially radially extending openings 52 between which are wedge-shaped hollow fingers or fins 53 through which a chilled refrigerant, such as brine, may be circulated. Inasmuch as the fins 53 are filled with a very cold refrigerant and come in direct contact with the cut surfaces of the tomato, a very quick and efficient freezing or heat transfer is obtained.

All of the elements coming in contact with the cut surface of the tomato may become frosted due to moisture from the slices. The scrapers 27 are provided to remove the frost not only from the cutting knives, but from the surfaces of the tapes 34 and the fins 53 of the refrigerating chamber, if used. These hinged scraper elements 27 follow substantially the same paths as the corresponding tomato slices and thus engage the same surfaces that the tomato slices engage. The frost removed from the blades and other elements drops through the open links 22 and can be removed from time to time from the bottom of the tunnel 30.

It is, of course, possible to use direct brine freezing for refrigerating the slices by providing the chamber 35 with suitable brine sprays. However, this practice is not as satisfactory as those described above for the reason that the slices will acquire a salty taste due to the contact of the brine with the tomatoes. Moreover, frequent changes in the brine are required to avoid altering the flavor of the tomatoes.

From the preceding description of typical methods embodying, and of apparatus for practicing, the invention, it will be understood that the method and apparatus are susceptible to considerable modification without departing from the invention. For example, although the invention has been described in connection with tomatoes, it is equally applicable to other fruits and vegetables of similar bulk and liquid content, which may not be supplied to remote markets by reason of spoilage or which must be picked or harvested before ripening, with consequent loss of or decrease of valuable vitamin, mineral or flavor content, and the like. Other examples are mangoes, oranges, lemons, onions, cucumbers, potatoes, and the like, and in the case of vegetables, they may be parboiled, blanched, or otherwise partially cooked before slicing and freezing. Hence, the term tomato when used herein and in the appended claims is understood to comprehend such equivalent fruits and vegetables. The forms of the apparatus and the methods described herein should be considered as illustrative and not as limiting the scope of the following claims.

I claim:

1. A method of quick-freezing an edible article of the class of vegetables and fruits, which comprises cutting the article into a plurality of slices connected at one edge, spreading said slices apart to expose their cut surfaces, and subjecting the cut surfaces of said slices to a refrigerating means maintained at quick-freezing temperature.

2. A method of quick-freezing an edible article of the class of vegetables and fruits, which comprises slicing the article into a plurality of slices connected at one edge to the other slices by an unsliced portion of the article, spreading the slices apart, immediately bringing the surfaces of said slices into contact with refrigerating means maintained at quick-freezing temperature, until said article is quick-frozen, and pressing said slices together.

3. A method of quick-freezing edible articles of the class of fruits and vegetables, which comprises the steps of chilling an article to slightly above 32° F., cutting the article into a plurality of slices without substantially separating the slices, separating the slices to expose the cut surfaces of said slices, subjecting the slices to a refrigerant maintained at quick-freezing temperature, and thereafter pressing said slices together to restore said article substantially to its original shape.

4. An apparatus for quick-freezing an edible article of the class of vegetables and fruits comprising a refrigerating tunnel, a conveyor extending through said tunnel, a plurality of means on said conveyor each adapted to receive an article, a plurality of cutting elements spaced apart transversely, and extending lengthwise of said tunnel adapted to engage each article and cut it into a plurality of slices, means in said tunnel for spreading said slices apart fanwise to expose their cut faces, refrigerating means for chilling a portion of said tunnel to quick-freezing temperature to quick-freeze said slices, and means for pressing said frozen slices together to restore said article substantially to its original shape.

5. An apparatus for quick-freezing an edible article of the class of vegetables and fruits, comprising an elongated chamber, a conveyor extending through said chamber, a plurality of holders on said conveyor, each adapted to receive an article to be frozen, each holder including a plurality of resilient spaced apart segments extending lengthwise of said conveyor, a plurality of cutting elements in said chamber adapted to pass between said segments and partially cut said article into a plurality of slices connected at one edge, means in said chamber for separating said slices to expose their cut surfaces, and means for chilling a portion of said chamber to quick-freezing temperature to quick-freeze said slices.

6. An apparatus for quick-freezing an edible article of the class of vegetables and fruits, comprising a refrigerating tunnel, a conveyor extending through said tunnel, a plurality of means on said conveyor each adapted to receive an article, a plurality of cutting elements spaced apart transversely of said tunnel adapted to engage each article and cut it into a plurality of slices, a plurality of thin, narrow guides extending lengthwise of said tunnel and receivable between said slices, said guides having portions diverging fanwise to separate said slices, and refrigerating means for chilling a portion of said tunnel to quick-freezing temperature to quick-freeze said slices.

7. An apparatus for quick-freezing an edible article of the class of vegetables and fruits comprising a refrigerating tunnel, a conveyor extending through said tunnel, a plurality of means on said conveyor each adapted to receive an article, a plurality of cutting elements spaced apart transversely of said tunnel adapted to engage each article and cut it into a plurality of slices, means in said tunnel for spreading said slices apart to expose their cut faces, heat exchanging means in said tunnel having hollow fins engageable with the cut surfaces of said slices, and means for circulating a refrigerant through said hollow fins.

8. An apparatus for quick-freezing an edible article of the class of vegetables and fruit comprising a refrigerating tunnel, a conveyor extending through said tunnel, a plurality of means on said conveyor each adapted to receive an article, a plurality of cutting elements spaced apart transversely of said tunnel adapted to engage each article and cut partially through it to divide it into a plurality of connected slices, means in said tunnel for spreading said slices apart to expose their cut faces, refrigerating means for chilling a portion of said tunnel to quick-freezing temperature to quick-freeze said slices, and means on said conveyor for engaging, scraping and defrosting said cutting elements.

9. An apparatus for quick-freezing an edible article of the class of vegetables and fruits, comprising a refrigerating chamber, a conveyor extending through said chamber, a plurality of means on said conveyor each adapted to receive an article, a plurality of spaced apart cutting elements in said chamber adapted to engage each article and cut it partially through to divide the article into a plurality of connected slices, means in said chamber for spreading said slices apart to expose their cut faces, refrigerating means for chilling a portion of said chamber to quick-freezing temperature to quick-freeze said slices, means adjacent to said conveyor for pressing said frozen slices together, and a plurality of resilient fin-like scrapers carried by said conveyor adapted to pass between and scrape the surfaces of said cutting elements.

ALBERT F. HOFFMAN.

REFERENCES CITED

The following references are of record in the file of this patent:

UNITED STATES PATENTS

| Number | Name | Date |
|---|---|---|
| 1,353,167 | Luther | Sept. 21, 1920 |
| 1,671,723 | Jagenburg | May 29, 1928 |
| 2,221,220 | Pack | Nov. 12, 1940 |

FOREIGN PATENTS

| Number | Country | Date |
|---|---|---|
| 141,876 | Great Britain | Apr. 29, 1920 |
| 239,979 | Great Britain | Sept. 24, 1925 |

OTHER REFERENCES

Food Industries, August 1944 (vol. page 632) 87–88.

Bulletin 201, Geo. Exp. St., Microscopic Studies of Frozen Fruits and Vegetables, page 27.